Figure 1:
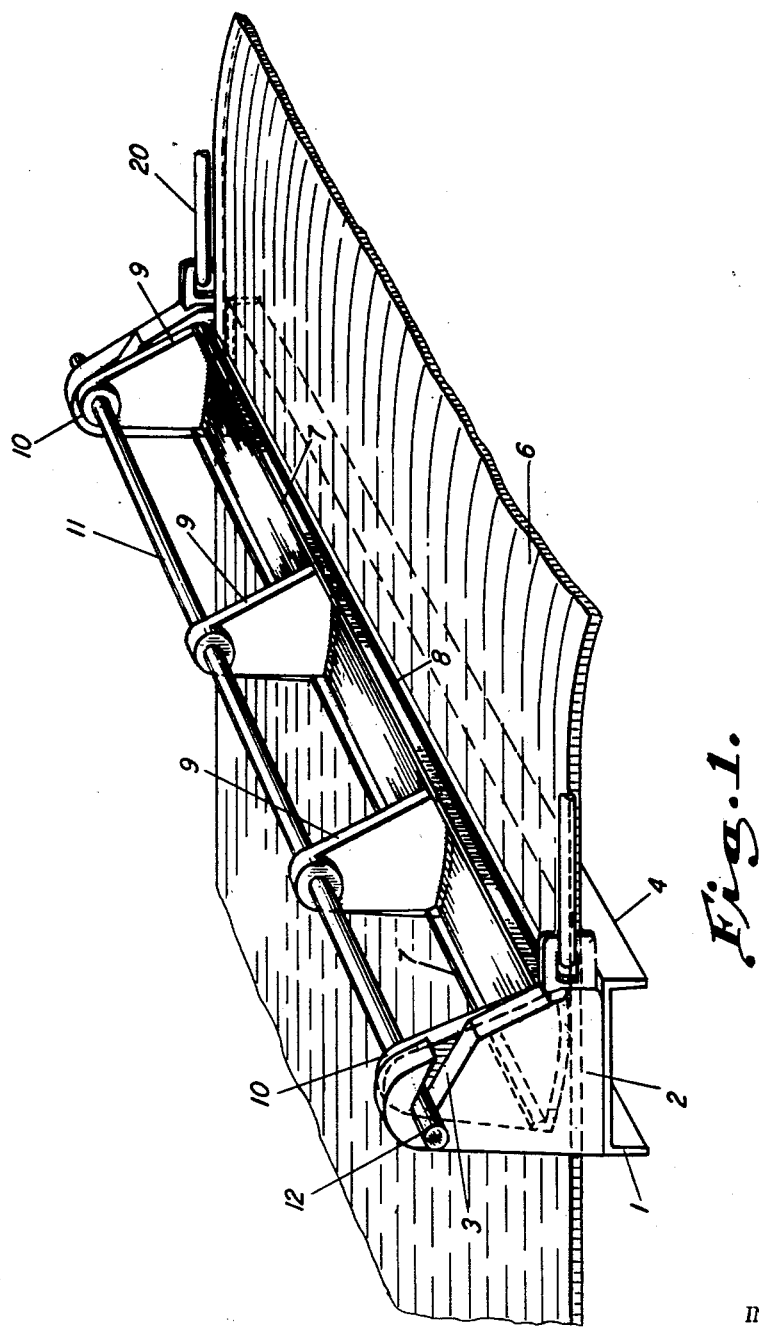

June 28, 1960 P. W. AUSMAN 2,942,847
BELT STRETCHING AND HOLDING DEVICE
Filed June 27, 1957 2 Sheets-Sheet 1

INVENTOR.
BY Paul W. Ausman
Chas. Denegre
Attorney.

June 28, 1960  P. W. AUSMAN  2,942,847
BELT STRETCHING AND HOLDING DEVICE
Filed June 27, 1957  2 Sheets-Sheet 2
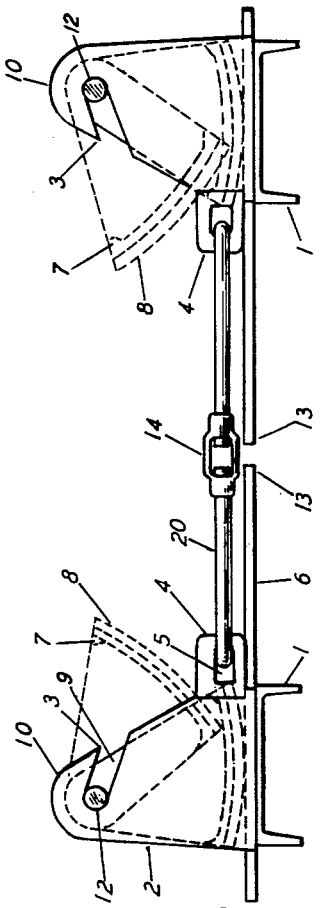
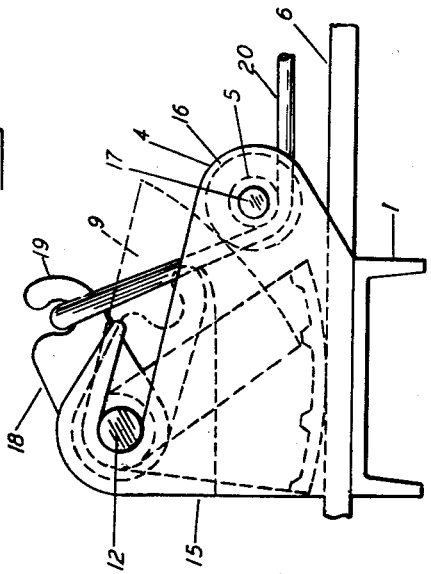
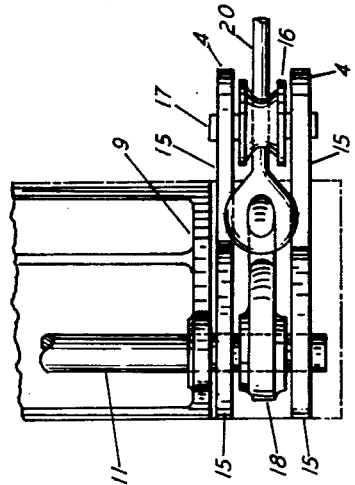
INVENTOR.
Paul W. Ausman
BY Chas. Denegre
Attorney.

United States Patent Office 2,942,847
Patented June 28, 1960

2,942,847

BELT STRETCHING AND HOLDING DEVICE

Paul W. Ausman, 921 6th Ave. W., Birmingham, Ala.

Filed June 27, 1957, Ser. No. 668,460

1 Claim. (Cl. 254—54)

This invention relates to a belt stretching and hold back device. It has for its main objects to provide such a device that will be highly satisfactory for the purpose intended, simple in structure, comparatively cheap to manufacture, easy to use and keep in good working condition, and extremely durable.

Further objects are to provide such a device that will be light in weight and easy to move from place to place for use; made in such a way that it will not damage a belt when used on same; be used in combination with any kind of pulling device such as a turnbuckle or pull jack or the like; will not injure the surface of a belt as rubber is used for making contact with the belt; for use in pulling the ends of a belt together for connecting same.

Other objects and advantages will appear from the drawings and description.

By referring generally to the drawing it will be observed that Fig. 1 is a perspective view of a unit of the device made according to this invention; Fig. 2 is a side elevational view of a modified device made according to this invention; Fig. 3 is a top plan view of the device shown in Fig. 2; and Fig. 4 is a side elevational view of a pair of units showing swingable portions in broken lines, a turnbuckle mounted removably between them, and a piece of belt in each unit.

Similar reference numerals refer to similar parts throughout the several views.

Referring to the drawings in detail it will be seen that the device comprises two similar units each of which has a lower base 1 with an integral upright end 2 having a slot 3 and an extension 4 with a hole 5 therein. This base part fits under the belt 6 when in use. The upper swingable part comprises a curved portion 7 with an attached rubber facing 8. Upward extensions 9 are integral with the top face of the curved portion and have their top ends 10 attached in fixed condition on a round bar 11 that has its ends 12 inserted in the slots in the ends of the upward extensions on the base. In use for connecting the ends 13 of a belt a unit is mounted on each end portion of the belt as shown in Fig. 4. Then a turnbuckle 14 is attached in the holes in the upward extensions on the base and by manual means applied to the turnbuckle the swingable curved portion with rubber face makes contact with the upper face of the belt and clamps it tightly against the upper face of the base as plainly shown in Fig. 4 as a result of the ends of the round bar being forced upward in the slots thus increasing the radius between the bar in the upper ends of the slots and the rubber face of the curved portion.

A modified form of unit is for use on heavy belts. It comprises an upward double extension 15 provided with a small pulley 16 mounted on a shaft 17. The swingable part is provided at each end with an integral arm 18 with a hook 19. A chain or cable 20 must be used for connection to a turnbuckle or pull jack. When such units are in use they will grip the belt more tightly as the pull is more effective as a result of the hook type arms on the ends of the bar and the cables or chains on the pulleys.

From the foregoing it will appear that the device is adapted for holding the ends of a belt together for permanent connection to be accomplished.

The device may be made of any material suitable for the purpose, but I prefer to use high grade light metal such as aluminum or the like, and a good grade of sheet rubber; also the device may be made in different sizes and capacities depending on the sizes of belts on which to be used.

While I have shown and described the preferred embodiment of my invention, I do not wish to limit same to the exact and precise details of structure, and reserve the right to make all modifications and changes so long as they remain within the scope of the invention and the following claim.

Having described my invention I claim:

A belt stretching and hold back device of the character described comprising, two similar clamping units, each unit consisting of a flat comparatively narrow oblong part as a base made of light metal, two upright integral extensions on each end of the base, said extensions having upwardly slanting slots in their upper end portions, a shaft mounted and extending between each pair of extensions in the lower portions of said extensions, a small pulley mounted on each said shaft, said pulley and slots being on the same edge of said extensions; an upper swingable member, this member being a curved ablong piece of metal of a size to fit between each pair of the upward extensions on the base, said curved part having a piece of rubber attached on its entire lower outer face, a plurality of integral upward extensions on the upper face of said curved member; a round bar mounted with its ends in said slanting slots in said double extensions on the base ends, the upper ends of said plurality of extensions being attached in fixed condition to said bar, an arm attached on each end of said bar and positioned between said double extensions, said arm having a hook formed in its end; connecting cables attached by an end in each said hook and leading from the hook and under said pulley and extending outward, said bar and parts thereto attached being swingably mounted in said slanting slots with slight space between the upper face of said base and the outer face of the rubber on the curved member; two turnbuckles mounted between two similar units and connected to the cables leading from the hooks and being adapted by manual means to pull said two units toward each other and clamp an end of a belt in each of said units between said rubber face and base face.

References Cited in the file of this patent

UNITED STATES PATENTS

| | | |
|---|---|---|
| 50,609 | Miller et al. | Oct. 21, 1865 |
| 507,625 | Lindsay | Oct. 31, 1893 |
| 1,084,139 | Ermisch | Jan. 13, 1914 |
| 1,238,649 | Doyle et al. | Aug. 28, 1917 |